United States Patent
Adams et al.

(10) Patent No.: US 7,359,624 B2
(45) Date of Patent: Apr. 15, 2008

(54) PORTABLE DVD PLAYER

(75) Inventors: Dale R. Adams, San Jose, CA (US); David C. Buuck, Santa Clara, CA (US); Cheng Hwee Chee, Saratoga, CA (US); Laurence A. Thompson, Saratoga, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 561 days.

(21) Appl. No.: 10/942,740

(22) Filed: Sep. 15, 2004

(65) Prior Publication Data

US 2005/0053365 A1  Mar. 10, 2005

Related U.S. Application Data

(63) Continuation of application No. 09/166,606, filed on Oct. 5, 1998, now abandoned.

(60) Provisional application No. 60/060,974, filed on Oct. 6, 1997.

(51) Int. Cl.
*H04N 7/26* (2006.01)
*H04N 5/00* (2006.01)
*H04N 7/00* (2006.01)

(52) U.S. Cl. ............... 386/124; 386/125; 386/105

(58) Field of Classification Search ........... 386/124, 386/125, 126, 45, 46, 105, 104, 1
See application file for complete search history.

(56) References Cited

U.S. PATENT DOCUMENTS

| 5,438,344 | A | * | 8/1995 | Oliva | 345/530 |
|---|---|---|---|---|---|
| 5,477,415 | A | * | 12/1995 | Mitcham et al. | 361/686 |
| 5,784,115 | A | | 7/1998 | Bozdagi | |
| 5,963,261 | A | * | 10/1999 | Dean | 348/446 |
| 6,055,018 | A | | 4/2000 | Swan | |
| 6,104,755 | A | | 8/2000 | Chara | |
| 6,166,772 | A | | 12/2000 | Voltz et al. | |
| 6,269,484 | B1 | | 7/2001 | Simsic et al. | |
| 6,489,998 | B1 | | 12/2002 | Thompson et al. | |
| 6,504,577 | B1 | | 1/2003 | Voltz et al. | |
| 6,577,345 | B1 | | 6/2003 | Lim et al. | |
| 6,847,405 | B2 | | 1/2005 | Hsu et al. | |
| 6,867,814 | B2 | | 3/2005 | Adams et al. | |
| 6,909,469 | B2 | | 6/2005 | Adams | |

* cited by examiner

*Primary Examiner*—Bob Chevalier
(74) *Attorney, Agent, or Firm*—Perkins Coie LLP

(57) ABSTRACT

A portable DVD player includes a generally thin prismatic enclosure having a first major surface, a second major surface separated from the first major surface, and side surfaces connecting the first major surface to the second major surface. At least a portion of the first major surface includes a video display. The enclosure further includes a DVD entry port such that a DVD can be inserted into the enclosure. A digital processing system within the enclosure includes a decoder, a deinterlacer, and a display controller. The decoder receives signals from a DVD inserted into the enclosure to provide a decoded, interlaced video signal, the deinterlacer converts the interlaced video signal to a deinterlaced video signal, and the display controller uses the deinterlaced video signal to provide progressively scanned video on the video display. Preferably, the portable DVD player is both mechanically and electronically isolated for physical shocks to the player.

30 Claims, 8 Drawing Sheets

PORTABLE DVD PLAYER

CROSS REFERENCE TO RELATED APPLICATIONS

This application is a continuation of U.S. application Ser. No. 09/166,606 filed on Oct. 5, 1998 now abandoned, which claims the benefit of U.S. Provisional Patent Application No. 60/060,974 filed on Oct. 6, 1997, both of which are incorporated herein by reference.

BACKGROUND OF THE INVENTION

1. Field of the Invention

The present invention relates generally to portable video playback devices, and more particularly to portable digital video disc (DVD) playback devices.

2. Description of the Related Art

Prior to the advent of digital video technology, video information was recorded and transmitted as analog electrical signals. While analog video transmitters, receivers, and combination playback/record machines such as video cassette recorders (VCRs) can be built inexpensively, analog video is hard to search, edit, sort or enhance. In addition, pre-recorded analog media such as video cassettes for VCRs are rather expensive to produce and distribute.

There has been a rapid evolution from analog video technology to digital video technology, mainly because of the advantages that digital video has to offer. Digital video can be stored and distributed more cheaply than analog video mainly because digital video can be stored on randomly accessible media such as magnetic disc drives (hard disks) and optical disc media known as compact discs (CDs). Once stored on a randomly accessible media, digital video may become interactive, allowing it to be used in games, catalogs, training, education, and other applications. Even movies, which have traditionally been a chronologically linear media, may become interactive, allowing viewers to select their point of view, a plot path and the ending of the movie.

One of the newest products to be based on digital video technology is the digital video disc, sometimes called "digital versatile disc" or simply "DVD." These discs are the size of an audio CD, yet hold up to 17 billion bytes of data, 26 times the data on an audio CD. DVD storage capacity (17 Gbyte) is much higher than CD-ROM (600 Mbyte) and a DVD can deliver the data at a higher rate than CD-ROM.

With the help of MPEG and Dolby compression technologies, a DVD can hold hours of high quality audiovisual content. DVD technology is predicted to be the eventual replacement for VCR technology, as well as a replacement for interactive multimedia applications currently based on CD-ROM technology. The enormous capacity of DVDs allows up to four feature-length movies to be stored on a single disc, with audio and video quality that is superior to that offered by other video formats.

A DVD looks like a conventional CD. More specifically, a DVD is made up of a reflective aluminum foil encased in a clear plastic. Like a CD, data is recorded on the disc in a spiral trail of tiny pits, and the discs are read using a laser beam. The DVD's larger capacity is achieved by making the pits smaller and the spiral tighter, and by recording the data in as many as four layers, two on each side of the disc. The pits of a DVD are formed in the foil by stamping it with a glass master. In the case of a single-sided DVD, the stamped disc is backed by a dummy, which may contain graphics advertising the contents of the disc. For a double-sided disc, two halves, each with their foil full of data, are bonded back to back.

While any kind of digital data can be distributed on a DVD, the first application of this new medium has been full-length feature movies. As a movie medium, DVD has many advantages over today's VHS tapes and laser discs. One advantage is that both the video and multi-channel audio produced by DVDs are superior to those possible with current technologies. Another advantage is that DVD will be the first digital medium to present movies in wide-screen format.

Because DVD is a random access device, it is possible for the player mechanism to seek to any place on the disc and begin playing. It can also pause, play in slow motion or fast forward easily, and with a much clearer picture than available from a tape player. These random access features allow an unlimited number of possible applications, from multiple endings for a movie, to interactive video games, to multiple camera angles.

In its raw state, digital video is so voluminous that a feature-length movie would require 40 DVDs at 4.7 billion bytes each. Fortunately, digital video in its raw state is comprised mostly of redundancies, i.e. elements that are the same or nearly so, which can be identified and removed. This process is referred to as compression (or sometimes "encoding") and can eliminate over 97 percent of the data required to represent the video without noticeably affecting image quality.

DVD technology uses the MPEG-2 digital video compression standard. More particularly, to deliver the high image quality of DVD while fitting a movie into the 4.7 gigabyte capacity of a single DVD layer, a process called "variable bit rate encoding" is used. MPEG encoding compresses video by eliminating redundancies. The average data rate for video on a DVD is about 3.7 million bits per second. To provide superior sound, DVDs incorporate either Dolby's AC-3 Surround Sound or MPEG-2 audio. AC-3 or "Dolby Digital" provides six channels and MPEG-2 provides up to eight, each channel completely separate from the others.

DVD players include a motor that spins the disc, and a laser that reads information from the disc. The laser uses visible red light (as opposed to an audio CD player's infrared laser) to "read" the pits etched in the disc. These laser pulses are translated into electrical form by a digital signal processor (DSP), which is one type of integrated circuit. DVD players also include a digital decoder and a microcontroller.

The digital audio/video decoder is an integrated circuit that reconstitutes the compressed data on the disc, converting it into studio-quality video and CD-quality audio for output to TVs and stereo systems. The microcontroller controls the operation of the player, translating user inputs from the remote control or front panel into commands for the audio/video decoder and the disc reader mechanism. The microcontroller is also responsible for such operations as implementing parental lockout, dialing distributors for access codes and controlling decryption.

In summary, DVD technology represents a tremendous improvement in video and audio quality over traditional systems such as televisions, VCRs and CD-ROM. However, the technology has been difficult to utilize in part because DVD players are typically large, cumbersome devices that are difficult to transport. Furthermore, because DVD players must be operationally attached to a video display, such as a television or television monitor, they are virtually impossible to use anywhere space is limited, such as in a car or on an airplane.

Furthermore, prior art mobile video systems suffer from a large number of annoying problems. Hand-held and mobile television sets typically exhibit reception maladies such as RF multipath interference and poor or erratic signal strength in rural areas. Integrated TV/VCR combo units can counter these problems by providing tape playback capability, but they tend to be physically large and not truly portable. In view of the forgoing, it is desirable to have a portable DVD player capable of being easily transported and being used under a wide variety of conditions.

SUMMARY OF THE INVENTION

The present invention fills these needs by disclosing an apparatus and method for providing DVD based video and audio playback system that is simple and easy to use, self-contained, and compact enough to take almost anywhere. It should be appreciated that the present invention can be implemented in numerous ways, including as a process, an apparatus, a system, a device or a method. Several inventive embodiments of the present invention are described below.

A portable DVD player in accordance with the present invention includes a generally thin prismatic enclosure having a first major surface, a second major surface separated from the first major surface, and side surfaces connecting the first major surface to the second major surface. At least a portion of the first major surface includes a video display. The enclosure further includes a DVD entry port such that a DVD can be inserted into the enclosure. A digital processing system within the enclosure includes a decoder, a deinterlacer, and a display controller. The decoder receives signals from a DVD inserted into the enclosure to provide a decoded, interlaced video signal, the deinterlacer converts the interlaced video signal to a deinterlaced video signal, and the display controller uses the deinterlaced video signal to provide progressively scanned video on the video display. Preferably, the portable DVD player is both mechanically and electronically isolated for physical shocks and jolts to the player.

A DVD signal processing system in accordance with the present invention includes a decoder decoding MPEG encoded signals derived from a DVD to produce a decoded, interlaced video signal, a deinterlacer converting the decoded video signal to a deinterlaced video signal; and a display controller using the deinterlaced video signal to provide progressively scanned video for a video display. Preferably, the DVD signal processing system includes a microprocessor providing control signals to the decoder, the deinterlacer, and the display controller.

A method for providing a video display in accordance with the present invention includes receiving an MPEG encoded signal from a DVD, decoding the MPEG encoded signal to develop an interlaced video signal; deinterlacing the interlaced video signal with a line doubling process to develop a progressively scanned video signal. Preferably, the method also includes buffering the MPEG encoded signal prior to the decoding for the purpose of mechanical shock isolation.

An advantage of the present invention is that it includes a liquid-crystal display, long life rechargeable battery, headphones with surround sound capability, and a full complement of audio/video connections. These components allow for fully independent operation and compatibility with any television, home theater, or other video system.

Another advantage of the present invention is that it is housed in a compact "tablet" form factor making it very rugged, yet easy to use and transport. The flexibility and cost-effectiveness of the tablet make the inherent advantages of DVD even more compelling by providing the first-to-market portable video playback presentation system based upon this the new DVD multimedia format.

Another advantage of the present invention is that it offers the first true "bits to photons" architecture in the marketplace. Within the present invention, video data is stored, processed and transported in the digital domain until it is converted directly to light in the integral display module. With no analog video anywhere in the playback chain, the highest possible image quality and realism are realized, providing the viewer with a very "clean" presentation.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A method and apparatus for a portable DVD player is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
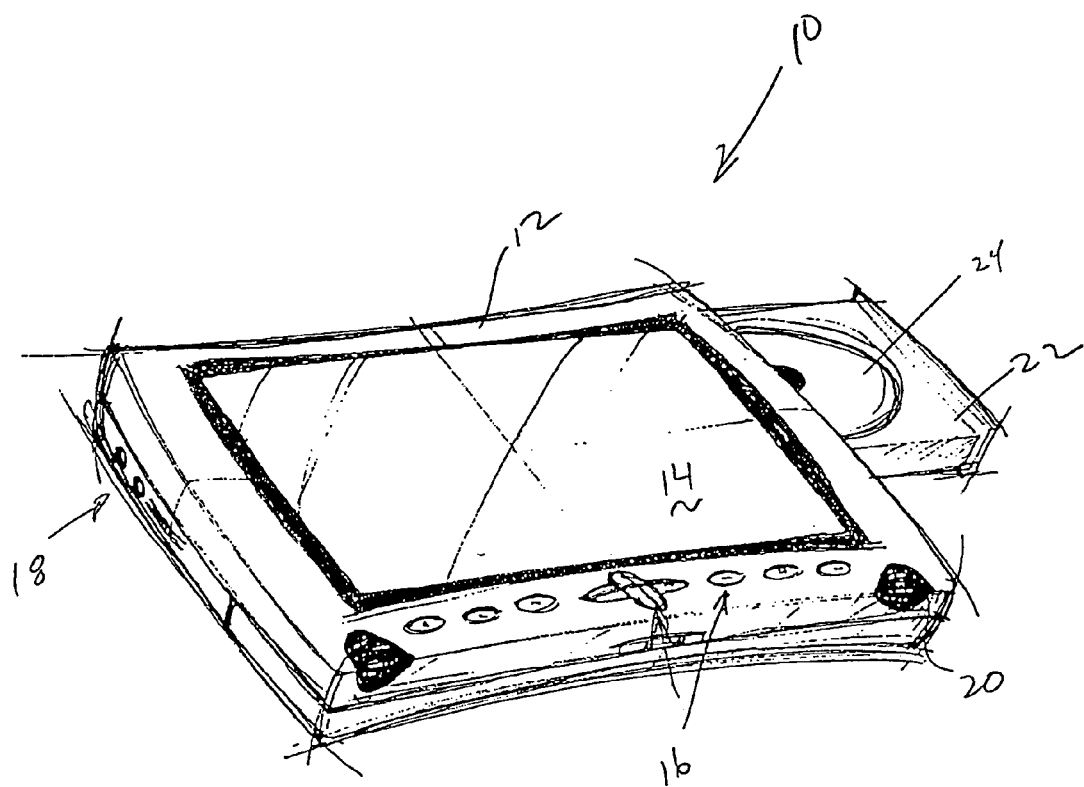
FIG. 1 illustrates a portable DVD player in accordance with one embodiment of the present invention.
Figure 2:
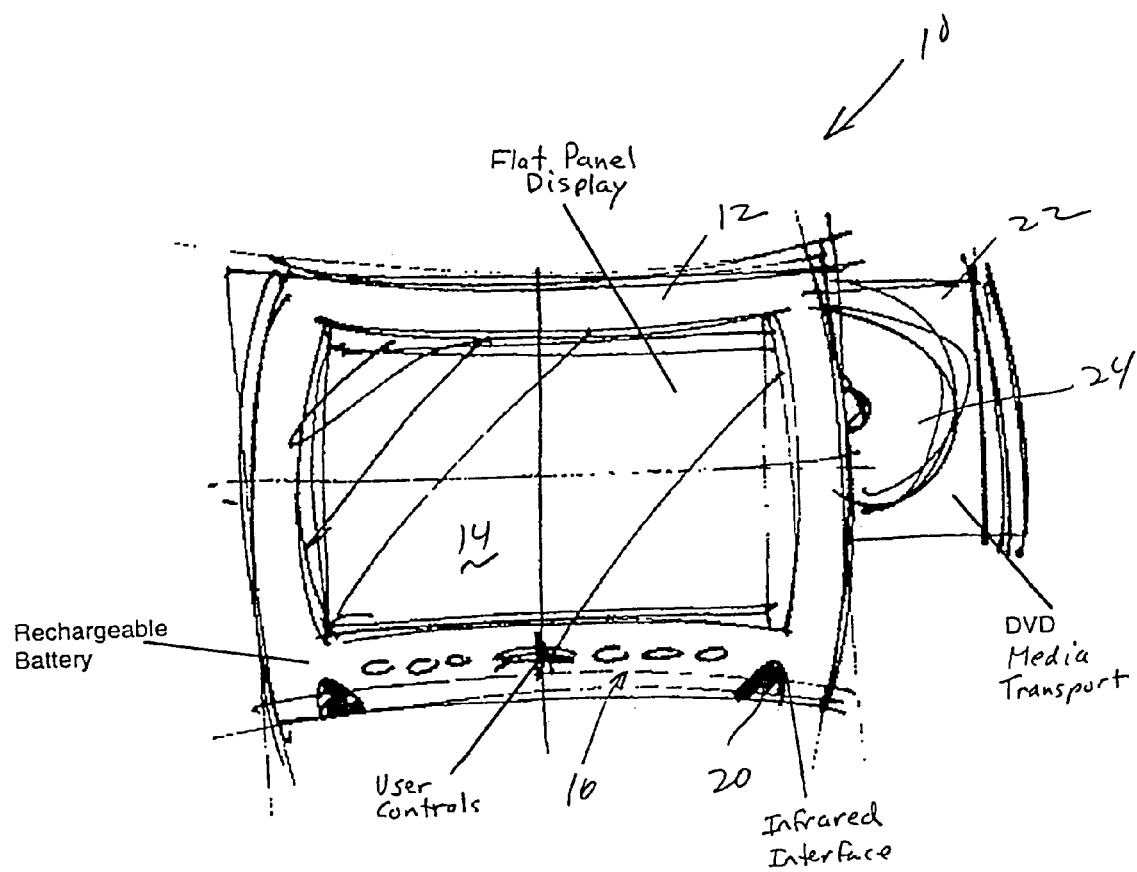
FIG. 2 is a top planar view of the DVD player shown in FIG. 1.

FIGS. 1 and 2 illustrate a portable DVD player 10 in accordance with one embodiment of the present invention. The DVD player 10 includes a enclosure 12 that serves as an enclosure for the components of the DVD player 10. A screen 14 for viewing the video and control buttons to control the DVD player 10 are located on the top face of the enclosure 12. Power (a.c. and/or d.c.) and signal interfaces 18 are located on one of the two side faces of the enclosure 12, while an infrared (IR) interface 20 and a media transport 22 (including a drawer having a recess receptive to the DVD) are located on the other side face. A DVD 24 can fit within a suitably configured recess in the drawer of the media transport 22, and the media transport 22 withdraws or retracts into the enclosure 12 to permit the playback of DVD 24.

The enclosure 12 is a generally thin, prismatic enclosure. That is, the enclosure comprises a first major surface including the screen or video display 14, and a second major surface separated from and facing the first major surface. A number of side surfaces connect the first major surface to the second major surface. In the embodiments disclosed in FIGS. 1 and 2, the enclosure 12 is a generally rectangular prismatic structure, where the thickness of the enclosure is substantially less than the width and height of the enclosure, and wherein there are four side surfaces. This provides a rectangular tablet design, which is efficient and highly portable.

While the enclosure 12 is illustrated to be generally a rectangular prism in shape, it should be noted that the first and second major surfaces can be other than parallel and flat (e.g. the second major surface may be sloped with relation to the first major surface), the side surfaces can be curved or rounded, etc. Furthermore, other embodiments of the present invention have enclosure shapes other than that of a generally rectangular prism.

The media transport 22 is one preferred method for inserting a DVD into the enclosure 12. That is, a number of types of entry ports may be used for engaging a DVD 24 with the enclosure 12. For example, a slot may be provided in the enclosure 12, which is receptive to a DVD 24. Alternatively, a hinged door may be used. While a preferred embodiment of the present invention has a DVD entry port on a side surface of the enclosure 12, the entry port may also be provided in another surface of the enclosure 12.

Figure 3:
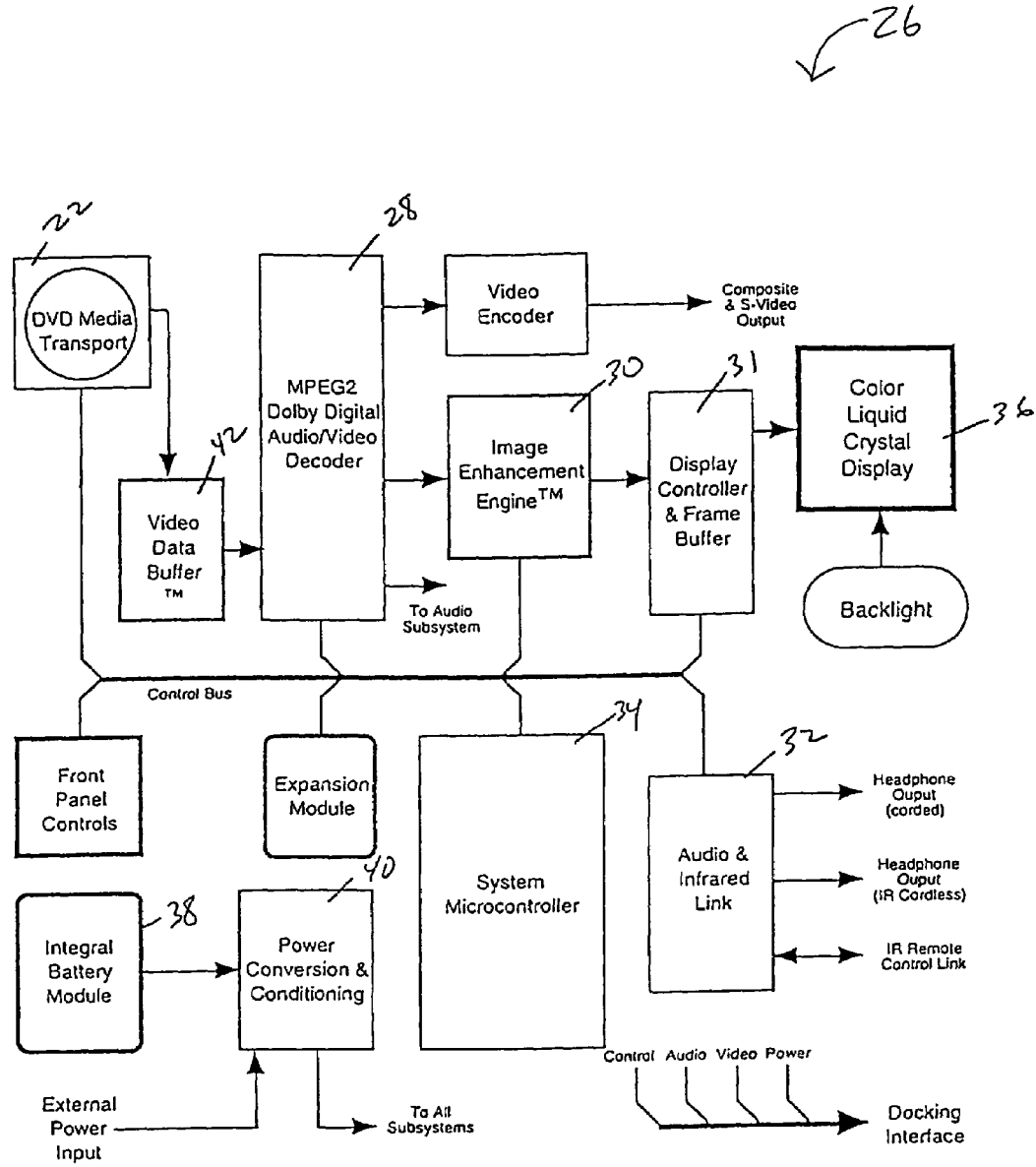
FIG. 3 is a block diagram of the electronic circuitry of the DVD player of FIGS. 1 and 2.

FIG. 3 is a block diagram of the drive module 26 of the DVD player 10 of FIGS. 1 and 2. The drive module 26 includes the media transport 22 that reads the DVD. Video data, which includes decoded, interlaced video data, from the DVD is then transferred over to a MPEG/Dolby digital (or "MPEG/AC-3") decoder 28. After decoding, an Image Enhancement Engine™ ($IE^2$) 30 deinterlaces (i.e. it performs the function of a deinterlacer) the digital video to provide a deinterlaced video signal that can provide progressively scanned video signals. Finally, the video is displayed through a display 36 under the control of a display controller and frame buffer 31. The portion of the circuit of FIG. 3 that is involved in processing the video data (including the decoder, deinterlacer, and display controller) will be referred to generically as a digital processing system.

The DVD drive module 26 also includes an audio/infrared link 32, a system controller 34, a battery pack 38, a power supply 40, a video data buffer 42, and a user interface, among other illustrated components, busses, and sub-systems. The components of the DVD drive module 26 are primarily housed within the enclosure 12 and will each be described in detail below.

The DVD transport 22 preferably uses an off-the-shelf drive module 26 designed for portable computers. Preferably, the drive module 26 is seventeen mm or less in thickness, allowing a very thin system form factor. A suitable DVD drive module 26 is available from Toshiba America Information Systems, Inc. of Tokyo, Japan. Further, the drive module 26 of the present invention is preferably physically and electronically isolated from mechanical shocks and impacts. More particularly, the drive module 26 is mechanically shock mounted in the enclosure 12 (such mechanical shock mounts not being shown but being known to those skilled in the art), and data from the drive module 26 is buffered in memory for a period of time before decoding to allow sectors to be reread in the event of a shock-induced data stream discontinuity.

The MPEG/Dolby digital decoder 28 is preferably an off-the-shelf single-chip decoder targeted at consumer DVD players. It preferably performs both MPEG-1 and MPEG-2 decoding, Dolby digital ("AC-3"), MPEG, and LPCM audio decoding, has A/V synchronization, and has the characteristic that only a single memory device is required for data storage and buffering. Such decoders are available from a variety of sources, including C-Cube Microsystems of Milpitas, Calif.

The $IE^2$ 30 preferably deinterlaces digital video from DVD or any other source to provide progressively-scanned video signal, including proprietary motion detection and compensation hardware. It further preferably corrects brightness, contrast, gamma, and color temperature correction for clear and accurate video display. To further improve the image, a high quality scaling engine of the $IE^2$ 30 is preferably used to convert video image from rectangular to square pixels and to scale the video for full-screen display on flat panel sizes other than 640×480.

The audio/IR link 32 (comprising one or more integrated circuit chips) decodes the Dolby digital data stream provided from MPEG2/Dolby digital decoder 28, mixes 5.1 channels down to 2 channels for conventional stereo output, and encodes/processes 5.1 channels for surround headphone output (optional module). Stereo D/A converters are provided for headphone output.

D/A converters for 5.1 channel Dolby digital stream are available on the docking module connector. An undecoded Dolby digital stream for outboard decoders is also available on the docking module connector. An optional IR transmitter for wireless headphones may be provided, as may stereo speakers with small stereo power amp for presentations or playback without headphones.

The system controller 34 is preferably a single-chip microprocessor handling most, if not all, system control functions. For example, the microprocessor preferably handles system startup and configuration, user interface & controls, feature set selection (e.g., parental control, etc.), DVD drive control, and $IE^2$, MPEG decoder, audio system, and display controller configuration A suitable microprocessor is available as part number MC68HC16 from Motorola, Inc. of Austin, Tex.

The display 36 is preferably an 11.3" LCD display (both active and passive matrix models available) with high-output fluorescent cold cathode back light. The display 36 preferably has 640×480 pixel resolution and 18-bit color depth. A suitable display is available from Sharp Electronics Corp. of Camas, Wash. The video controller for the display 36 provides high-resolution, flexible onscreen graphics, overlay of graphics onto full-screen video playback, and LCD drivers for direct connection to display.

The enclosure 12 is preferably made with a "tablet" form factor, which is easy to use and carry. The single piece design of the enclosure 12 provides simplicity, ease of manufacture, ruggedness, reduced weight, and serviceability. An optional docking station allows simple one-connection hookup to external video systems.

The battery pack 38 is preferably a replaceable, rechargeable module based upon NiMH technology for high power density at low cost. Preferably the battery pack uses standard, off-the-shelf 1,767 battery cells having a 40 watt-hour capacity which provides sufficient power for over 2.5 hours of continuous operation. This period of time is normally sufficient to view a full, feature-length movie.

Also shown are inputs and outputs to/from the unit. While interconnections from the system controller 34 to other components are shown as a bus, these may in fact be realized via discrete connections if appropriate for the specific off-the-shelf components chosen. The architecture of the DVD drive module 26 has been designed for modularity of components and ease of expandability.

System expansion is accomplished via an I/O option module interface, which allows the drive module 26 to interact with both the video and audio subsystems, as well as the system controller 34. This interface accommodates expansion modules with functions such as alternate audio and/or video inputs and specialized audio processing, allowing the present invention to be customized by the user for a variety of applications.

Alternate product configurations are easily accommodated by substitution of key system components. Since standard components are used in many areas of the system (e.g., the DVD drive module 26), similar components can simply be substituted. For instance, a more compact unit can be built by utilizing a smaller LCD and battery. The display controller directly accommodates varying display sizes, while the power converter and battery charger are configurable for different battery sizes and technologies. More fully functioned base configurations are possible by simply including additional (optional) components for added functionality. For example, a unit with a full complement of video and audio I/O requires only the addition of extra D/A converters, a video decoder, extra connectors, and enclosure modifications.

The system software of the DVD player of the present invention is preferably structured into two main levels: the high-level user interface software and the low-level device control software. The software runs on the system microcontroller 34, and is preferably stored on a read only memory ("ROM") (not shown). The low-level section interfaces directly with the various hardware components of the system, interacting directly with them at a register level. It provides for power-on and initialization, configuration of the hardware components, basic device control and synchronization, and interface to the user interface software.

Between the two levels the present invention provides a "control/status" Application Program Interface ("API"). This is a moderately high level interface, with the API functions corresponding almost directly with the typical user controls—e.g., "play," "skip to next track," "show elapsed time," etc. The control functions provide a means for the user interface software to issue commands for control of the player, while the status functions allow the user interface software to acquire information about the state of the player hardware.

This architecture permits customized user interface software. The "control/status" API provides a clean break between the user interface and the low-level device control software, allowing another user interface, e.g., a customized user interface, to be substituted for the player's standard software. It will therefore be appreciated that the software architecture of the present invention can support a variety of product configurations, allowing a rich product family with excellent longevity and scalability.

A power supply includes a DC-to-DC power converter to allow the use of an internal battery or external DC source. The DVD player 10 preferably derives all required internal voltages from a single DC power source. A high voltage inverter provides power needed for display back light. A charger (not shown) is used to re-charge the internal rechargeable battery. The user interface includes a straightforward control strip on the front bezel for quick access to common functions, and the software user-interface allows full-featured, yet simple and intuitive player control. Software controls rendered via high resolution graphics can overlay video for immediate user feedback.

Operational Details

Much of DVD video software is stored in an interlaced format. When this interlaced video is shown on a non-interlaced (or progressively scanned) display, such as used in the computer industry, a number of detrimental motion artifacts are created. The present invention provides video image deinterlacing and image enhancement via the Image Enhancement Engine™ ($IE^2$ 30).

$IE^2$ 30 deinterlaces the digital video from a DVD or other video source via motion detection and compensation techniques to provide a progressively-scanned video signal. Deinterlacing requires complex real-time processing that must automatically detect whether the original source material is film or video and adapt its processing accordingly. In general, the computer graphics industry ignores the problems of displaying high quality, artifact-free images on progressively scanned displays, and while others in the industry have provided solutions to this problem, these solutions are typically very expensive and not suitable to a portable, low-power application.

In addition to solving the problem of interlace artifacts, $IE^2$ 30 addresses the quality issues of presenting video on LCD screens by providing brightness, contrast, gamma, and color temperature correction to ensure that video is clearly and accurately displayed. $IE^2$ 30 also includes an innovative, high quality scaling engine to convert video images from the rectangular pixels stored on DVD to the square pixels needed for the flat panel display. The result of this combination of unique video processing is a clear, crisp video display without equal in the marketplace.

The present invention is a portable video player, and hence will be subjected to frequent mechanical shocks due to the operational environment. These shocks can cause momentary loss of tracking for the DVD drive mechanism, which in turn result in disruption in both audio and video playback.

The present invention provides two layers of isolation for physical shocks and impacts: mechanical and electronic. Physical shock isolation is accomplished via mechanical shock mounting within the enclosure. This isolation is integral to the enclosure itself and employs a mechanical damping mechanism. The second level of shock isolation is electronic and is performed by the Video Data Buffer ("VDB") 42 integrated circuit (see FIG. 3).

Data from the drive is buffered in memory for a brief period before decryption and decoding to allow disc tracks to be reread in the event of a shock-induced data stream discontinuity. This technology is also applicable to DVD-ROM computer drives for laptop computers and can be licensed to vendors of those drives. While portable CD audio players have used a similar technology since circa 1987, this technique has not yet been applied to video discs and VDB 42 is the first known instance of this shock isolation technique for DVD technology.

The present invention incorporates an enclosure specifically designed for its unique combination of components and technologies. The "tablet" form factor is easy to use and carry, and the single-piece enclosure is designed for simplicity, ease of manufacture, ruggedness, light weight, and ease of serviceability. There are no current combination video playback/display devices available in this form factor, which will give the present invention a competitive advantage by making it instantly recognizable and completely unique in the marketplace. In addition, system peripherals such as the docking station, which allows simple one-connection hookup to external video systems, enhance the system's originality and attractiveness.

Custom user interface software makes the present invention straightforward and simple to use. The highly ergonomic software menu and control setup allows full-featured, yet simple and intuitive player control. User interface graphics are rendered on the LCD screen in much higher resolution than found on consumer DVD players for exceptional clarity and readability. These graphics can also overlay active video for immediate user feedback on the action of software controls.

Preferred Standard Features

The present invention includes a number of preferred standard features, including a portable, self-contained DVD audio/video playback and viewing system, and a tablet form factor for portability, simplified design, ruggedness, and low weight. The compact unit weighs approximately 4 lbs. and measures only 9"×11"×1.1". The present invention plays DVDs, standard audio CDs, and video CDs and provides full screen, full frame-rate, full motion video playback on the integral 11.3" full-color, high-brightness backlit liquid crystal display (LCD).

The portable DVD player 10 also includes a full set of audio and video outputs (see Appendix A: Specifications, incorporated herein, for further details) and unique image processing circuitry to enhance standard (NTSC) video on the built-in display. Simplified user controls are bezel-mounted for standard basic functions and an onboard infrared transmitter is integrated to drive (optional) cordless headphones. An expansion module bay allows user to add functionality to customize the system for individual desires and uses.

Preferred Additional Features

In addition to the preferred standard features, the present invention preferably includes a number of preferred additional features, including a full set of audio and video inputs via plug-in Video Input Module (VIM) (in the expansion module bay) and infrared cordless headphones for wireless connection between headphones and tablet. The VIM allows unit to be used as a video processor for external sources.

The preferred embodiment possesses audio processing for full surround sound with standard stereo headphones. A TV Tuner Module converts the portable DVD player 10 to a fully portable, battery-operated television. In addition, the home theater docking station allows hassle-free, one-step connection to external TV or AN system. An IR remote control allows full remote operation of unit.

The portable DVD player 10 has six operating modes and three power modes. The operating modes give the present invention six functions including: (1) use as a self-contained DVD player with output on the built-in screen, (2) use as a DVD player using audio and video outputs to drive an external AV system, (3) use as a video monitor using (optional) video & audio inputs from an external source, (4) use as an audio CD player only—no video, (5) use as line-doubler for an external video source using an video input module, and (6) use as portable television using a TV Tuner Module.

The three power modes of the present invention include: an internal battery that powers entire system (for over 2.5 hours), an AC wall adapter that provides DC power for system, and a DC source (e.g., auto cigarette lighter adapter) that provides DC power for system. Additional features and specifications may be found in Appendix A, attached hereto and forming a part hereof.

Portable DVD Player Applications

Figure 4A:
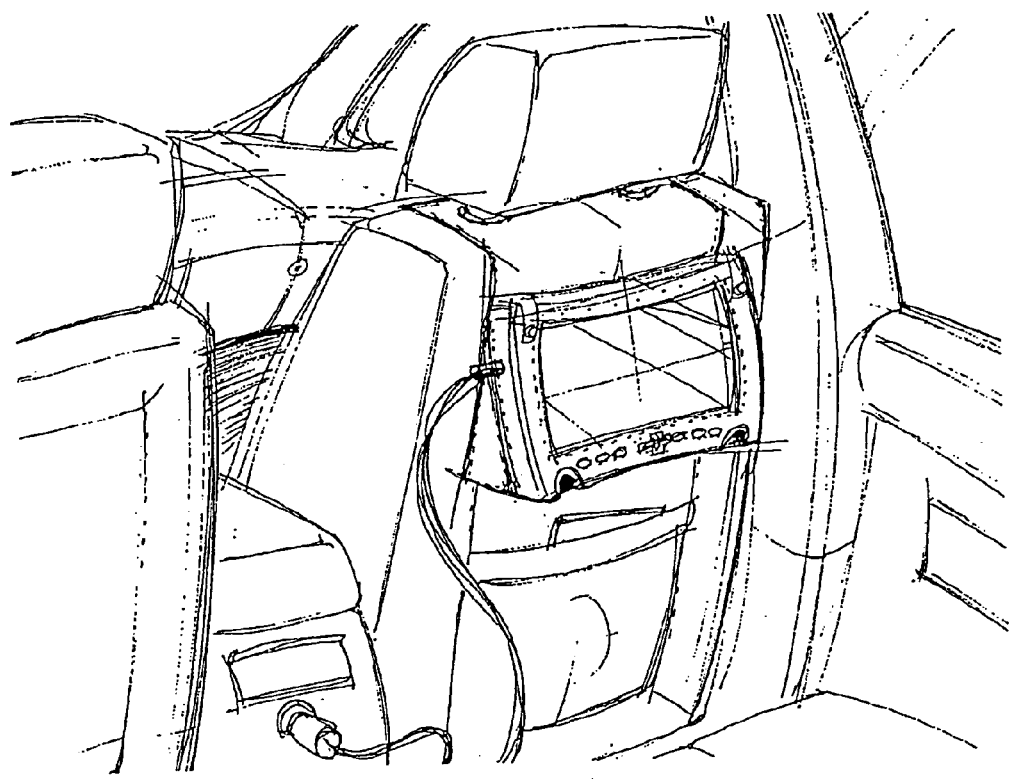
FIGS. 4a, 4b, and 4c illustrate some applications for the DVD player of the present invention.
Figure 4B:
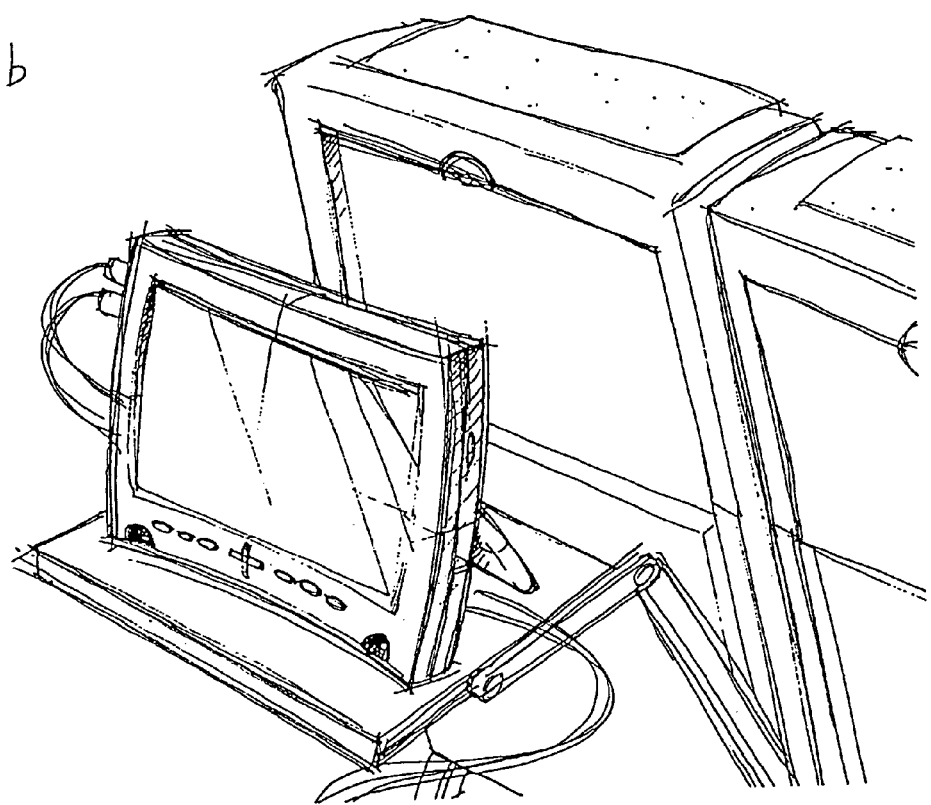
Figure 4C:
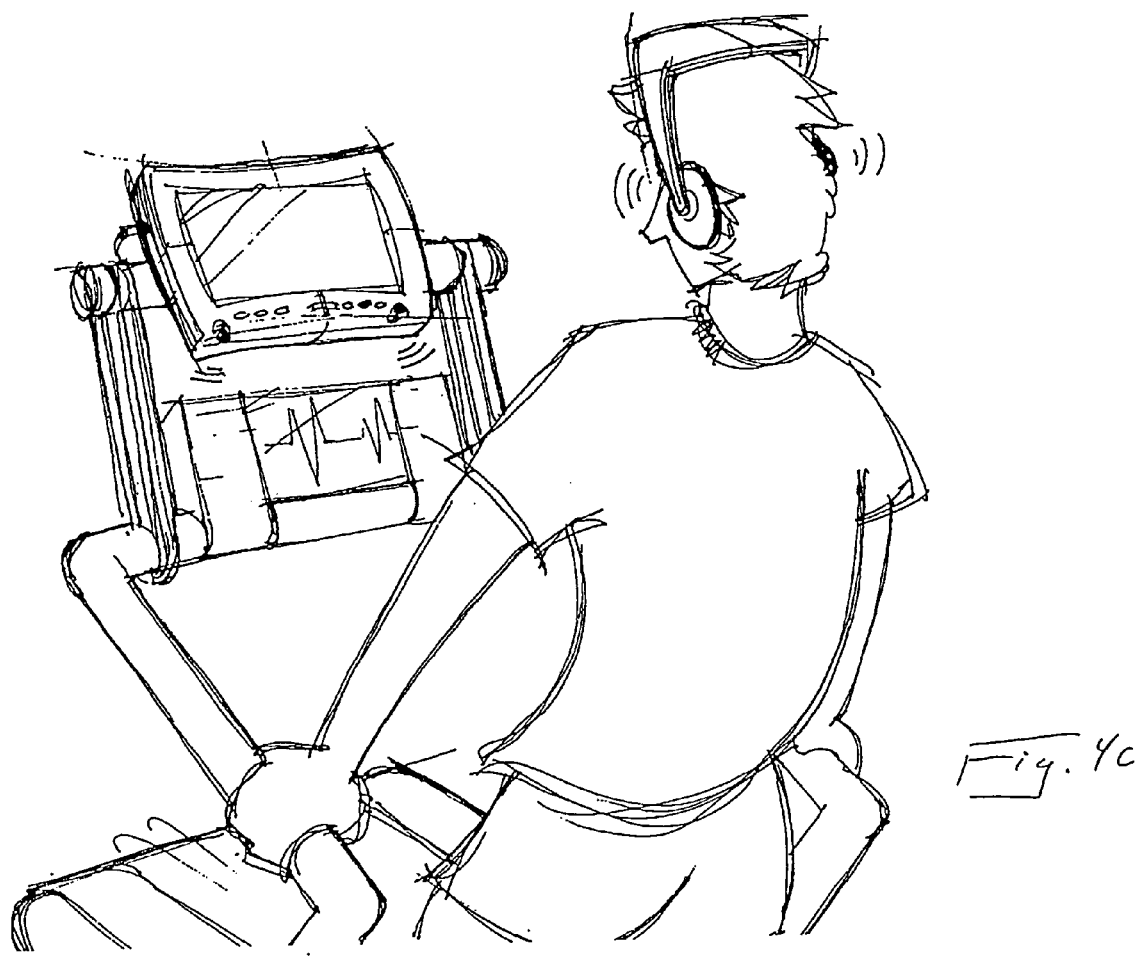

There are many uses for the portable DVD player of the present invention. FIG. 4A shows an illustration of use in an automobile, but the idea can be extended to most types of transportation. The present invention is ideally suited to the traveler who spends long hours in a passive commute, such as on an airplane, train, or subway as illustrated in FIG. 4B. In addition, many commercial applications are possible as well—for example, video advertising in taxicabs or other settings where a captive audience exists. The present invention can also be placed on the magazine rack of every Stairmaster® exercise machine and treadmill in a fitness center setting, as illustrated in FIG. 4C.

Wherever portable video playback is needed, the present invention can be there. Anywhere great sound, DVD and CD playback, or TV viewing is desired, the present invention will be the ideal mobile solution. Great examples of the versatility of the present invention uses are: air travel entertainment—movies, videos, etc., personal education and study (each disc is capable of storing thousands of books), and on-the-spot do-it-yourself videos—auto repair, gardening, cooking, home projects.

Furthermore, the present invention can be used as a portable video display device for video games, camcorder playback, or digital still camera image viewing, and for OEM applications such as video kiosks, commercial airliners and fitness centers. The portable DVD player 10 can also be used to present sales content—bus, elevator, taxicab, real estate walk through videos, etc. It can even be utilized as a hang-it-on-the-wall flat television or display device—fine art discs, "dynamic art", etc.

Other Embodiments

When it is not being used as a portable player, the present invention can be connected to home video equipment to serve as a conventional home DVD player by using the optional docking module and remote control. The transition from home player to portable is accomplished by simply lifting the present invention from the docking module, with no cables to disconnect or reconnect later; the present invention automatically senses its docking module and alters its behavior accordingly.

The present invention can connect to large format displays, such as projection systems or computer monitors, and can automatically process the video images as appropriate using its unique video processing engine. The present invention can also serve as a home theater "line doubler" to perform the enhancement processing typically found only in expensive dedicated theater setups at a fraction of the cost. With its optional video input module, it can perform this enhancement processing on video from its own DVD drive, or on an externally applied video signal, such as a broadcast source or laser disc. The VIM also allows any external video signal to be displayed on the present invention's display.

The present invention is part of a product family based on the original concept of the present invention as the premier first-to-market self-contained portable DVD playback platform. A first embodiment of the present invention introduces the "tablet" form factor to the video marketplace. A second embodiment introduces products with a high-resolution 16:9 aspect ratio display and tuner in Advanced Television (ATV) format, as well as a cost-reduced and feature-enhanced version of the first generation player. A major feature development in this second embodiment player is a slot-loading disc transport mechanism; this same mechanism will be preferably adopted across the product line. A third embodiment provides for a thin "desktop" style player for non-portable applications including an ATV format desktop player, and machines with DVD-RAM, enabling the recording of still imagery and digital video.

Additional Accessories

Figure 5:
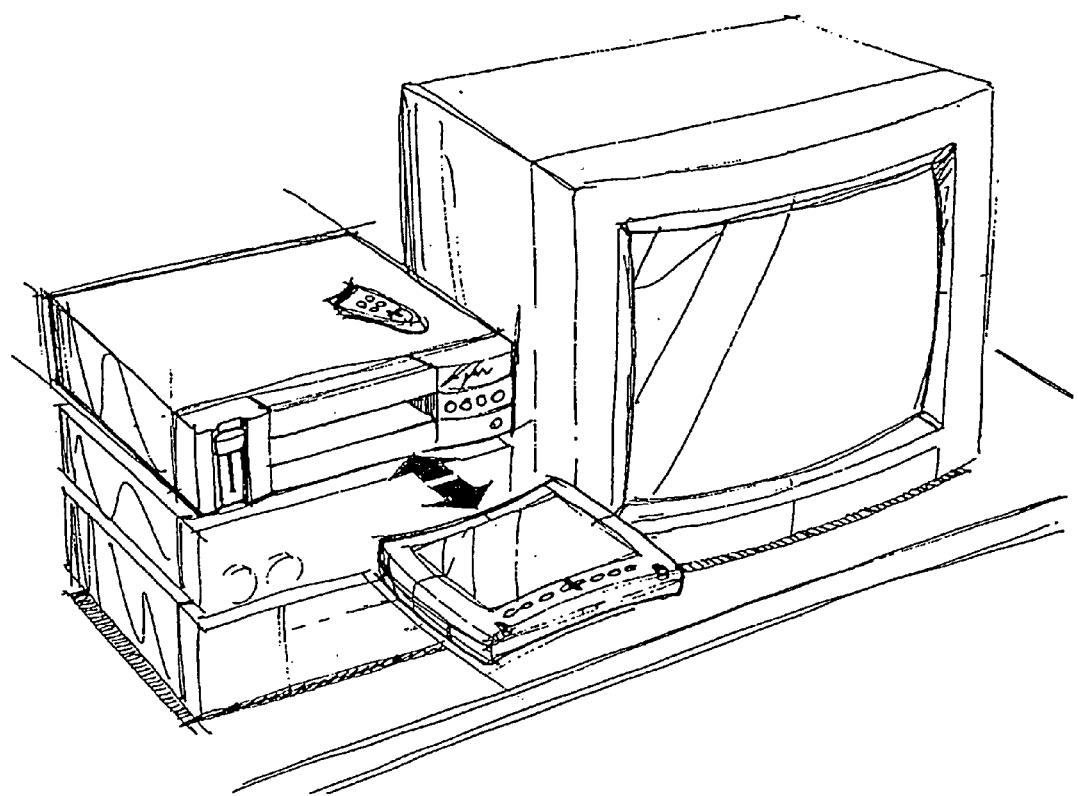
FIG. 5 illustrates a docking station and associated video monitor for the DVD player in accordance with one embodiment of the present invention.

As illustrated in FIG. 5, a "Home Theater Docking Station" provides an uncomplicated, one-step connection and operation capability for when the present invention is used as a simple DVD player with a normal home television set. The dock provides a cabled electrical interface to a television or other home theater components—such as an audio system—that can remain permanently in place for when the present invention is used with an external system. The dock is preferably the same form-factor as a typical VCR; it will be designed to blend in with the rest of the system components that a user owns, and also be instantly recognizable for its intended function.

An infrared remote control is preferably bundled with the docking station. The remote features a comprehensive control feature set optimized to access all of the additional enhanced features available with the DVD format. Central to the design of this remote control is a highly attractive industrial design that will carefully avoid the dreaded and difficult-to-use "sea of buttons" so commonly found on consumer product remotes.

A hard shell carrying case (not shown) provides complete environmentally sealed protection for the present invention and for a wide selection of support accessories. This product also allows the present invention to be checked as regular airline luggage, for when you want to take it on travel with you but don't wish to use it in transit. A soft carrying case (also not shown) is simple, yet rugged, and is similar to what is widely available for laptop computers.

A natural enhancement of the present invention is to support fully wireless, cord and cable-free viewing and listening. An Infrared Wireless Headphone system gives the user a clutter-free entertainment experience, while providing rich, clear sound reproduction.

An airplane power adapter accessory allows the present invention to be powered from an "EmPower" approved airline seat-side power output; it is fully compliant with RTCA DO-160C and FCC Class B requirements. A car power accessory allows the present invention to be powered from a standard automotive dashboard lighter power socket.

A mobile viewing cradle accessory product allows the mobile user to "sling" the present invention behind the front seat of an automobile so that back-seat passengers can view the LCD screen. The mobile viewing cradle is one of the "core" products for entertainment application support for the family embarking on an automobile journey, as described previously.

Surround sound on the present invention when using headphones is an option that will preferably be supported by licensing the Toltec Surround Sound Processor from Virtual Listening Systems of Gainesville, Fla. This processor utilizes advanced, low power digital signal processing technology to create a true surround sound effect with standard off-the-shelf stereo headphones. Without the optional Toltec Expansion Module, a discrete 5.1-channel to stereo mixdown will be fed to the headphone jacks, IR transmitter, and other audio outputs of the present invention.

A video input expansion module allows the present invention to display video from an external source, such as a VCR. This module also allows the system to function as an outboard "line doubler" (using the integral $IE^2$ 30) for other video displays, using the present invention's video output port. Game play, computer output display, and many other useful applications are supported using the Video Input Expansion Module.

A television expansion module converts the present invention into a fully featured television with onscreen broadcast channel indication and alternate audio track navigation capabilities. With the TV tuner module the system becomes an all-in-one DVD player and television. Equipped in this way, the present invention fully supports Dolby ProLogic Surround television broadcasts (with the optional Toltec Surround Sound Processor Expansion module piggybacked in the Expansion Module bay).

Additional preferred embodiments of the present invention utilize technology advances such as larger displays, advanced power sources, etc. For example, as 12.1 inch and 13.3 inch displays go into high-volume production for laptop applications, new versions of the product will be created to take advantage of falling display module prices and volume availability. The initial TFT display identified for the present invention is a dual-tube cold-cathode fluorescent module featuring a 250 nit output level.

A display of this brightness will be viewable under extremely bright ambient light conditions. Cutting edge display technologies, such as the Candescent ThinCRT, are also suitable alternative technologies. Battery technology is also advancing, albeit at a slower relative pace than display technology. The present invention currently utilizes a standard laptop computer cell package.

The FCC recently approved the standard for the new Advanced Television system (also known as High Definition Television [HDTV] or Digital TV [DTV]). The present invention product family is designed to be compatible with this new standard. Of the many video formats supported by the standard, most have higher resolution than either the current National Television System Committee (NTSC) standard or the display module resolution chosen for the first generation of the present invention. Some of the video formats are in a 16:9 aspect ratio instead of the 4:3 ratio found on today's video equipment. Higher resolution displays will be integrated into the present invention family to support these new high-resolution video formats.

In addition, many of the ATV formats are progressively scanned. The present invention is well suited to offer solutions compatible both with the new standard as well as with the enormous existing library of NTSC video source material. The technology in the $IE^2$ 30 allows the present invention family to maintain backward compatibility with old interlaced video sources on the progressively-scanned displays needed for ATV systems. In addition, the present invention has a very high quality video scaling engine available that can scale lower resolution NTSC video signals up to the higher ATV resolutions to fill the screen of a future ATV version of the present invention.

Figure 6:
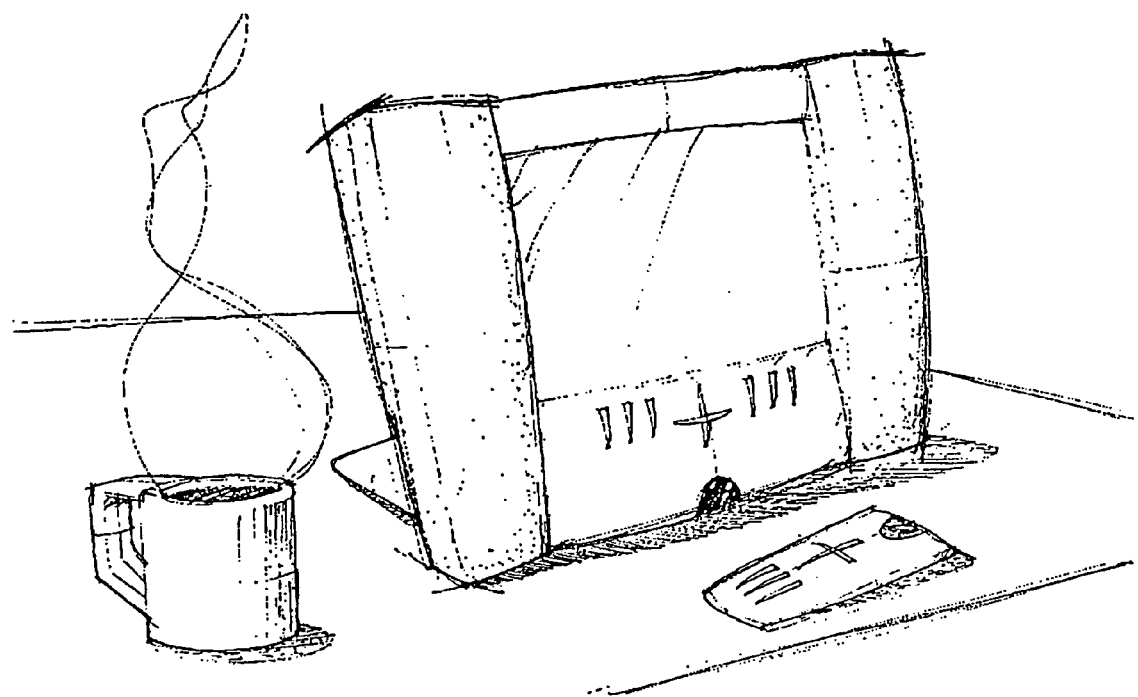
FIG. 6 illustrates a "DeskTablet™" DVD player in accordance with one embodiment of the present invention.

An enhanced version of the present invention for the desktop market is referred to herein as a "DeskTablet™" DVD player, and is illustrated in FIG. 6. Applications for the DeskTablet™ include uses such as in the bedroom, den, or kitchen, where a "fixed" unit placement is needed. This product is essentially in the same marketing space as conventional TV/VCR combination units. Similar in form factor to the "Monorail" personal computer, the thin DeskTablet form factor will be capable of either freestanding or wall hanging operation. Freed of many of the portability-driven design constraints required of the present invention mobile machine, the DeskTablet will include a high-quality integrated loudspeaker system.

Writable DVD-RAM storage transports make optical digital video recording possible. Sample quantities of the first DVD-RAM mechanisms are just now becoming available, with production availability in 1998; sometime after, portable DVD-RAM modules will also hit the OEM marketplace.

The present invention system with recording capability and an integrated video camera can replace the standard camcorder and VCR. Such a system would need to use a different compression scheme than DVD's standard MPEG-2 (due to the cost of MPEG-2 compression hardware) such as the JPEG-like schemes used by current digital VCRs. This embodiment of the present invention system would also be feature-capable of uncompressed 24-bits-per-pixel still and time-lapse digital photography of great capacity—thousands of high-quality images per recordable disc.

The FireWire digital networking interface (P1394 FireWire™ Interface) has already become a de facto standard on many of the first digital video camcorders that are now widely available (especially Sony's DV format product lineup). The present invention is the ideal environment for displaying digital video imagery from external sources via FireWire. This embodiment, with integral hardware code support, will allow both video input and output in a number of standard compression formats, all using the same FireWire port.

While this invention has been described in terms of several preferred embodiments, there are alterations, permutations, and equivalents that fall within the scope of this invention. It should also be noted that there are alternative ways of implementing both the process and apparatus of the present invention. It is therefore intended that the appended claim includes all such alterations, permutations, and equivalents as fall within the true spirit and scope of the present invention.

The invention claimed is:

1. A portable DVD player comprising:
a generally thin prismatic enclosure having a first major surface, a second major surface separated from said first major surface, and side surfaces connecting said first major surface to said second major surface, wherein at least a portion of said first major surface includes a flat panel video display, and wherein said enclosure includes a DVD entry port such that a DVD can be inserted into said enclosure; and
a digital processing system including a decoder, a deinterlacer, and a display controller where said decoder receives signals from a DVD inserted into said enclosure and reconstitutes compressed data on the DVD to provide a decoded, interlaced video signal, said deinterlacer converts said interlaced video signal to a deinterlaced video signal, and said display controller uses said deinterlaced video signal to provide progressively scanned video on said video display.

2. A portable DVD player comprising:
a generally thin prismatic enclosure having a first major surface, a second major surface separated from the first major surface, and side surfaces connecting the first major surface to the second major surface, wherein at least a portion of the first major surface includes a video display, and wherein the enclosure includes a DVD entry port such that a DVD can be inserted into the enclosure, and wherein a mobile viewing cradle is attached to the second major surface, and wherein at least two speakers are located on the first major surface, and wherein a plurality of control buttons are located on the first major surface; and
a digital processing system including a decoder, a deinterlacer, and a display controller where the decoder receives signals from a DVD inserted into the enclosure and reconstitutes compressed data on the DVD to provide a decoded, interlaced video signal, the deinterlacer converts the interlaced video signal to a deinterlaced video signal, and the display controller uses the deinterlaced video signal to provide progressively scanned video on the video display.

3. A portable DVD player as recited in claim 2 wherein the digital processing system includes a microprocessor providing control signals to the decoder, the deinterlacer, and the display controller.

4. A portable DVD player as recited in claim 2 wherein the prismatic enclosure is a generally rectangular prismatic enclosure.

5. A portable DVD player as recited in claim 4 further comprising a DVD transport mechanism associated with the port in the enclosure.

6. A portable DVD player as recited in claim 5 wherein the DVD transport mechanism comprises a drawer which extends from a side surface for the loading and unloading of a DVD and which retracts into the enclosure for the playing of the DVD.

7. A portable DVD player as recited in claim 2 wherein the enclosure is provided with a d.c. power port.

8. A portable DVD player as recited in claim 2 further comprising an infrared port associated with the enclosure and coupled to the digital processing system.

9. A portable DVD player as recited in claim 8 further comprising an infrared remote control providing control commands to the DVD player via the infrared port.

10. A portable DVD player as recited in claim 3 further comprising a docking station coupled to a video monitor, wherein the docking station includes a docking port receptive to at least a portion of the enclosure.

11. A portable DVD player as recited in claim 10 wherein the digital processing system further includes a video encoder coupled to the decoder for providing at least one of a composite and an S-Video output for the video monitor.

12. A portable DVD player as recited in claim 2 further comprising shock isolation for physical shocks impinging upon the enclosure.

13. A portable DVD player as recited in claim 12 wherein the shock isolation includes a mechanical shock mounting internal to the enclosure.

14. A portable DVD player as recited in claim 12 wherein the shock isolation includes a data buffer forming a part of the digital processing system.

15. A portable DVD player as recited in claim 2 wherein the mobile viewing cradle allows for the video display to be viewed in a non-horizontal plane.

16. A portable DVD player as recited in claim 15 wherein the mobile viewing cradle is hung on a back of a seat.

17. A portable DVD player as recited in claim 16 wherein the seat is a car seat.

18. A portable DVD player as recited in claim 16 wherein the seat is an airplane seat.

19. A portable DVD player as recited in claim 15 wherein the mobile viewing cradle is hung on an exercise machine such that a user can view the display while using the exercise machine.

20. A portable DVD player as recited in claim 15 wherein the portable DVD player is placed on a horizontal surface such that the mobile viewing cradle supports the portable DVD player at an angle to the horizontal surface.

21. A portable DVD player as recited in claim 20 wherein the horizontal surface is a table.

22. A portable DVD player as recited in claim 21 wherein the horizontal surface is an airplane seat flip-down tray.

23. A portable DVD player as recited in claim 2 wherein the plurality of control buttons comprises a power button, a menu button, a play button, a fast forward button, a reverse button, a chapter skip-ahead button, a chapter skip-behind button and a navigation button.

24. A portable DVD player comprising:
a tablet form-factor enclosure having a first major surface, a second major surface separated from the first major surface and side surfaces connecting the first major surface to the second major surface, wherein at least a portion of the first major surface includes a video display, and wherein the enclosure includes a DVD entry port such that a DVD can be inserted into the enclosure; and
a digital video processing system, contained in the tablet form-factor enclosure, includes a video data buffer, an audio/video decoder, a deinterlacer, a display controller and a video encoder, wherein the video data buffer is receptive to an interlaced video signal from a DVD inserted into the tablet form-factor enclosure and operative to develop a buffered interlaced video signal, and wherein the audio/video decoder is responsive to the buffered interlaced video signal and operative to develop a decoded interlaced video signal, and wherein the deinterlacer is responsive to the decoded interlaced video signal and operative to develop a deinterlaced video signal, and wherein the display controller is responsive to the deinterlaced video signal and operative to develop a progressive scan video signal to be displayed on the video display, and wherein the video encoder is responsive to the decoded interlaced video signal and operative to develop a composite video signal and an S-video signal such that the composite video signal or the S-video signal can be sent to an external video display.

25. A portable DVD player as recited in claim 24 further comprising a backlight situated on at least one edge of the video display for illuminating the video display in low illumination situations.

26. A portable DVD player as recited in claim 24 further comprising a plurality of control buttons, an expansion module, a system controller, a DVD media transport and an audio/infrared link all bi-directionally coupled to a control bus wherein the audio/video decoder, the deinterlacer and the display controller are also bi-directionally coupled to the control bus.

27. A portable DVD player as recited in claim 26 wherein audio/infrared link further comprises a headphone jack, an infrared headphone output and an infrared remote control link.

28. A portable DVD player comprising:
a generally thin prismatic enclosure having a first major surface, a second major surface separated from the first major surface, and side surfaces connecting the first major surface to the second major surface, wherein at least a portion of the first major surface includes a progressive video display, and wherein the enclosure includes a DVD entry port such that a DVD can be inserted into the enclosure; and
a digital processing system, located inside the enclosure, responsive to a compressed, interlaced video signal from the inserted DVD and operative to develop an artifact-free deinterlaced signal to be displayed on the progressive video display.

29. A portable video player comprising:
a generally thin prismatic enclosure having a first major surface, a second major surface separated from said first major surface, and side surfaces connecting said first major surface to said second major surface, wherein at least a portion of said first major surface includes a flat panel video display, and wherein said enclosure includes a DVD entry port such that a DVD can be inserted into said enclosure;
a digital processing system including a decoder, a deinterlacer, and a display controller where said decoder receives signals from a DVD inserted into said enclosure and reconstitutes compressed data on the DVD to provide a decoded, interlaced video signal, said deinterlacer converts said interlaced video signal to a deinterlaced video signal, and said display controller uses said deinterlaced video signal to provide progressively scanned video on said video display; and
a video input module for accepting and processing external video inputs for display on said video display.

30. The portable video player as recited in claim 29 further comprising a television tuner module, wherein said television tuner module receives and processes television signals for display on said video display.

* * * * *